United States Patent [19]

Schulte

[11] Patent Number: 5,737,225

[45] Date of Patent: Apr. 7, 1998

[54] NAVIGATION SYSTEM

[75] Inventor: Hans-Helmut Schulte, Eindhoven, Netherlands

[73] Assignee: U.S. Philips Corporation, New York, N.Y.

[21] Appl. No.: 496,105

[22] Filed: Jun. 28, 1995

[30] Foreign Application Priority Data

Jul. 1, 1994 [EP] European Pat. Off. ............ 94201903

[51] Int. Cl.$^6$ .................................................. G06F 165/00
[52] U.S. Cl. ...................... 364/449.5; 364/443; 340/990; 340/995
[58] Field of Search ................................ 364/443, 444.1, 364/444.2, 449.1–449.6; 73/178 R; 340/988, 990, 995

[56] References Cited

U.S. PATENT DOCUMENTS

| | | | |
|---|---|---|---|
| 4,939,662 | 7/1990 | Nimura et al. | 364/449.5 |
| 5,177,685 | 1/1993 | Davis et al. | 364/443 |
| 5,184,123 | 2/1993 | Bremer et al. | 364/449.5 |
| 5,206,811 | 4/1993 | Itoh et al. | 364/449 |
| 5,323,321 | 6/1994 | Smith, Jr. | 364/449.5 |
| 5,414,630 | 5/1995 | Oshizawa et al. | 364/449.3 |
| 5,416,478 | 5/1995 | Morinaga | 364/449.3 |
| 5,422,812 | 6/1995 | Knoll et al. | 364/449.3 |
| 5,430,655 | 7/1995 | Adachi | 364/449.3 |
| 5,463,554 | 10/1995 | Araki et al. | 364/449.5 |
| 5,537,323 | 7/1996 | Schulte | 364/449.5 |

FOREIGN PATENT DOCUMENTS

| | | |
|---|---|---|
| 0534533 | 3/1993 | European Pat. Off. . |
| 0560987 | 9/1993 | European Pat. Off. . |
| 0580166 | 1/1994 | European Pat. Off. . |
| 4324215 | 1/1994 | European Pat. Off. . |
| 9309510 | 5/1993 | WIPO . |

Primary Examiner—Gary Chin
Attorney, Agent, or Firm—Arthur G. Schaier

[57] ABSTRACT

A navigation system for a vehicle determines a route to be followed which includes a maneuver location in which the vehicle is to carry out a given maneuver. The system issues different kinds of instructions relating to the maneuver in different windows. The system can determine the position of these windows relative to the maneuver location on the basis of various instantaneous traffic conditions and on the basis of anticipated vehicle behavior.

11 Claims, 4 Drawing Sheets

NAVIGATION SYSTEM

BACKGROUND OF THE INVENTION

The invention relates to a vehicle navigation system, comprising a planner for a route to be followed which includes the indication of a manoeuvre location in which the vehicle is to carry out a manoeuvre, detection means for detecting an instantaneous vehicle location, and an instruction generator for supplying a driver with an instruction concerning said manoeuvre.

A system of this kind is used, for example to assist a car driver en route to his or her destination. To this end, the system utilizes information concerning feasible wads to the intended destination and determines a route to be followed from the instantaneous location to said destination. At appropriate manoeuvre locations, the system supplies the driver with instructions regarding manoeuvres to be carried out so as to follow said route. These instructions may be visible, audible or combined instructions. A system issuing a combination of visible and audible messages is described in a U.S. patent application assigned to the assignee of the present Application, U.S. Ser. No. 951,513, corresponding to European Application EP 534533-A1 (PHN 13.857). An important aspect is the instant at which an instruction is given. If the instruction is given too late, the driver will not have sufficient time to carry out the manoeuvre safely. If the instruction is given too early, the driver's attention will be focused excessively long on the manoeuvre to be executed and the driver may even become confused as regards the correctness of the procedure. Both problems strongly affect the usability of the system and may give rise to hazardous traffic situations. It is known to issue the instruction a fixed distance ahead of the location where the manoeuvre is to be carried out. A system described in International Patent Application WO 93/09510, corresponding to U.S. Ser. No. 786,450, additionally takes the instantaneous speed of the vehicle into account so as to determine the instant at which the instruction is issued. The aim is to ensure that a driver approaching the location of the manoeuvre at a high speed still has enough time to react.

The known navigation systems determine the instant at which the instruction is issued in a manner such that for many drivers a more or less acceptable result is obtained in many situations. The instant thus determined, however, is often far from optimum, because various circumstances actually involved are not taken into account in determining this instant. Examples of such circumstances are unchanging circumstances, such as the type of road, width of the road and type of manoeuvre to be carried out, but also incidental circumstances such as the driver's knowledge of the area, driving experience, and weather conditions. In the known navigation systems especially the incidental circumstances hardly receive attention for the determination of the instant at which the instruction is issued. As a result, the known systems issue an instruction regarding a manoeuvre to be carried out at an instant which is not optimum from a point of view of ergonomy and traffic safety.

It is an object of the invention to provide a navigation system of the kind set forth in which the issuing of an instruction, and notably the instant thereof, is more compatible with the traffic conditions concerning a manoeuvre location, so that a driver can drive a car equipped with the system more safely.

SUMMARY OF THE INVENTION

To this end, the navigation system in accordance with the invention is characterized in that the instruction generator is arranged to issue, in addition to a direct advice describing the manoeuvre in a first window, a notification in a second window, subject to given time conditions, which functionally and temporally anticipates the direct advice, and is also arranged to position at least one of the windows dynamically. By issuing a notification when the manoeuvre location is approached, which notification precedes the direct advice as a kind of preliminary advice, the driver's attention is drawn to the upcoming manoeuvre so that the driver can already carry out a preparatory action, for example a change of lanes. The direct advice and the notification are issued in a respective, suitable period which is referred to as a window. A window for a manoeuvre location is determined on the basis of specific circumstances concerning the location and the vehicle. In the case of a manoeuvre location, a window which is suitable for these specific circumstances is dynamically positioned. In given circumstances, for example when various manoeuvre locations succeed one another in rapid succession and the intervals therebetween are short, the issuing of the notification may be dispensed with. A major advantage of the system in accordance with the invention resides in the fact that the instant at which instructions are issued is adapted to the instantaneous circumstances. Furthermore, a notification prior to the direct advice alerts the driver and the driver will not be taken by surprise by the direct advice, because the driver has already had the opportunity to carry out a preparatory action, if necessary.

An embodiment of the navigation system in accordance with the invention is characterized in that it is arranged to issue a life sign, subject to given temporal conditions, in order to indicate an operational status of the system. On given route segments this situation may occur that no direct advice and notification are required for a prolonged period of time, because the vehicle need not carry out any manoeuvres on such a segment. So as not to leave the driver in doubt, the system issues a life sign which need not be directly related to an upcoming manoeuvre but which is intended to confirm the correct course of events. Such a life sign may be an explicit confirmation of the manoeuvre last carried out or a general indication that the mute followed is correct. If the manoeuvre locations are not spaced too far apart, the relevant notifications and advices will succeed one another at short intervals. In those circumstances no life sign will be issued.

An embodiment of the navigation system in accordance with the invention is characterized in that the instruction generator is arranged to determine a position in which the instruction is issued in dependence on an instantaneous speed V and/or an instantaneous position of the vehicle at the instant of issuing of the instruction. When the instantaneous vehicle speed is high, the instruction generator should issue the instruction in a position which is more remote from the manoeuvre location than when the speed is low. By taking the vehicle speed into account in determining the position in which the instruction is issued, adequate time is always granted to react to the instruction.

An embodiment of the navigation system in accordance with the invention is characterized in that the instruction generator is arranged to determine an instant at which the direct advice is issued in dependence on a standard human response time. After having received the instruction, a driver will require a given period of time to respond to the instruction and interpret it. Subsequently, the driver will need a given period of time to evaluate the instruction, to lake a decision, and to commence an action so as to carry out or prepare a given manoeuvre. In the navigation system an instant at which an instruction is issued is related to the anticipated instant of arrival at the manoeuvre location. Furthermore, the system converts the instant at which the instruction is issued into a position on the road. In this embodiment the instruction generator takes into account the distance travelled during the response time, so that the position in which the instruction is issued better suits the circumstances.

An embodiment of the navigation system in accordance with the invention is characterized in that the instruction generator is arranged to determine an instant at which the direct advice is issued in dependence on a speed $V_j$ which is characteristic of the execution of the relevant manoeuvre. The navigation system has information available concerning the manoeuvre to be carried out and it can derive therefrom the speed at which the manoeuvre can be carried out. If the instantaneous vehicle speed is higher than this manoeuvre speed, in determining the position for issuing the instruction the instruction generator takes into account the distance required so as to reduce the speed. The advantage thereof resides in the fact that the position in which the instruction is issued is accurately determined in conformity with the relevant circumstances.

An embodiment of the navigation system in accordance with the invention is characterized in that the instruction generator issues the direct advice if the vehicle is present within a direct advice window which extends from a lower boundary at a distance $DA_{min}$ from the manoeuvre location to an upper boundary at a distance $DA_{max}$ from the manoeuvre location, that the instruction generator issues the notification if the vehicle is present within a notification window which extends from a lower boundary at a distance $NO_{min}$ from the manoeuvre location to an upper boundary at a distance $NO_{max}$ from the manoeuvre location, and that the instruction generator issues the life sign when the vehicle is present within a life sign window which extends from a lower boundary at a distance $LS_{min}$ from the manoeuvre location. The instruction generator is arranged to issue three types of instruction. A given type of instruction is issued when the vehicle is present within a given distance range, referred to as a window, ahead of the manoeuvre location. A window in the navigation system has two aspects. On the one hand, the window is a time window calculated in times relative to the anticipated time of arrival at the manoeuvre location. An aspect of a time window is, for example how many seconds in advance a given direct advice must be issued. On the other hand, the window is a distance window calculated in distances from the manoeuvre location. An aspect is then, for example in which position the system should issue a given direct advice. The navigation system is suitable for converting one aspect of a window into the other aspect. In given circumstances the variation of the vehicle speed upon approaching the manoeuvre location is anticipated. The organization of the issuing of the various types of instructions in different ranges offers the advantage that these types of instructions can be adapted to one another as well as to the manoeuvre location.

An embodiment of the navigation system in accordance with the invention is characterized in that the boundaries of the windows are dependent on a period $T_{response}$ which is characteristic of a standard human response time, that the boundaries of the windows are dependent on an instantaneous speed $V$ of the vehicle at the time of issuing of the instruction, that the boundaries of the windows are dependent on a speed $V_j$ which has been determined in advance and whose value is dependent on the manoeuvre location, and that when $V$ is greater than $V_j$, the boundaries of the windows are determined substantially by:

$$DA_{min}=V \times T_{response}+(V^2-V_j^2)/4$$

$$DA_{max}=DA_{min}+(V \times DA_{ww})$$

$$NO_{min}=DA_{max}+(V \times DANO)$$

$$NO_{max}=NO_{min}+(V \times NO_{ww})$$

$$LS_{min}=NO_{max}+(V \times NOLS)$$

and that when $V$ is smaller than $V_j$, they are determined substantially by:

$$DA_{min}=V_j \times T_{response}$$

$$DA_{max}=DA_{min}+(V_j \times DA_{ww})$$

$$NO_{min}=DA_{max}+(V_j \times DANO)$$

$$NO_{max}=NO_{min}+(V_j \times NO_{ww})$$

$$LS_{min}=NO_{max}+(V_j \times NOLS).$$

Using these formulas, the instruction generator determines the ranges in which the various types of instructions must be issued in a real case. The instruction generator converts periods of time, chosen on the basis of ergonomic considerations, into distances from the manoeuvre location and takes into account the above dependencies by utilizing the formulas.

An embodiment of the navigation system in accordance with the invention is characterized in that the system determines the speed $V_j$ on the basis of a number of road-characterizing parameters such as: a type of a road leading to the manoeuvre location, a class of road, a number of lanes of the road, a type of manoeuvre location, a type of area in which the manoeuvre location is situated. On the basis of a number of road-characterizing data present, the system can determine the speed at which the upcoming manoeuvre can be carried out. The advantage thereof consists in that the position for issuing the instruction can thus be accurately determined in conformity with the relevant circumstances.

An embodiment of the navigation system in accordance with the invention is characterized in that the instruction generator is arranged to concatenate, in predetermined conditions, the direct advice with a direct advice concerning a manoeuvre to be carried out in a further manoeuvre location. If two manoeuvre locations are situated at such a short distance from one another that no separate notification can be given for the second manoeuvre location, concatenation of the direct advices achieves that the second manoeuvre location is nevertheless announced in time. The advantage consists in that during or immediately after the execution of the first manoeuvre the second manoeuvre can be taken into account, if necessary.

BRIEF DESCRIPTION OF THE DRAWINGS

The invention will be described in detail hereinafter, by way of example, with reference to the drawing; therein.

DETAILED DESCRIPTION OF THE PREFERRED EMBODIMENTS

Corresponding references in the drawing denote similar elements.

Figure 5:
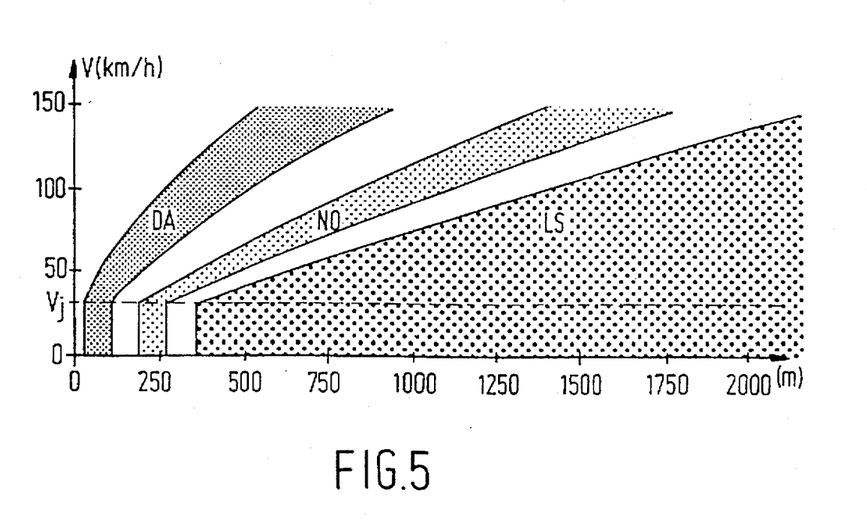
FIG. 5 shows a second detailed example of the windows.
Figure 6:
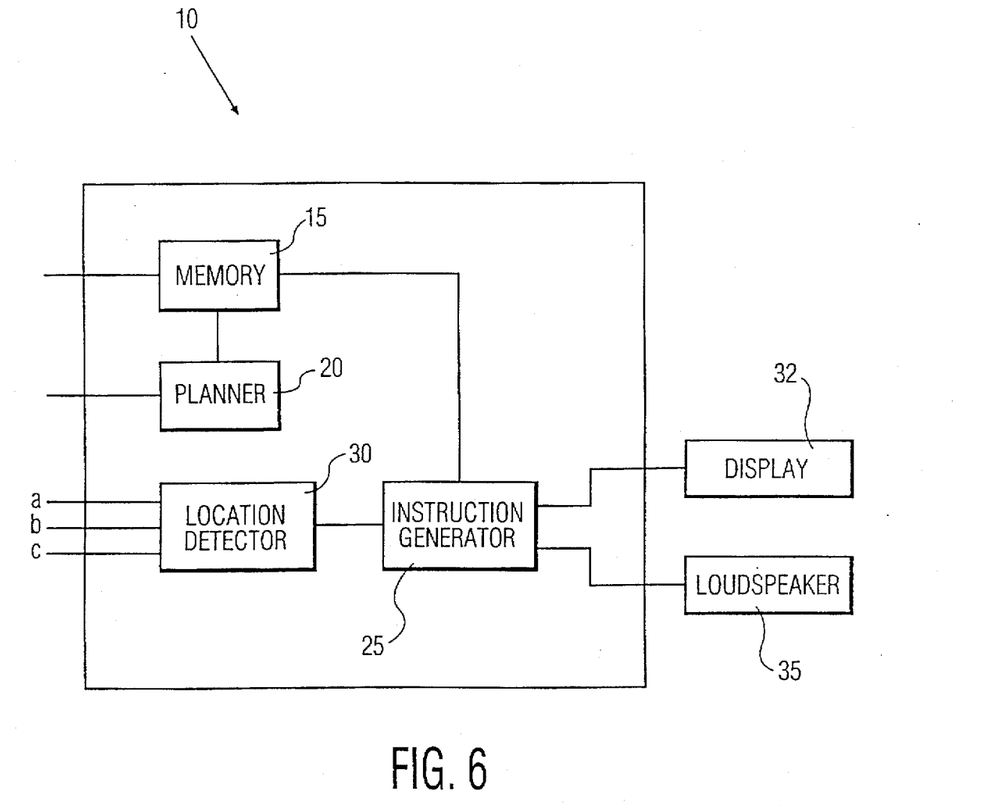
FIG. 6 is a block diagram of the navigation system constructed in accordance with the presnet invenetion.

Reference is first made to FIG. 6 which depicts a navigation system, generally indicated at 10, constructed in accordance with the presnet invenetion. In particular, navigation system preferably includes a memory 15 coupled to a planner 20 and an instruction generator 25. A location detection circuit 30, having three sensor inputs (a, b, c), is also coupled to instruction generator 25. Instruction generator 25 is coupled to a display 32 and a speaker 35. The functions of each of the identified features of navigation system 10 will be further discussed below in detail with reference to FIGS. 1–5.

Figure 1:
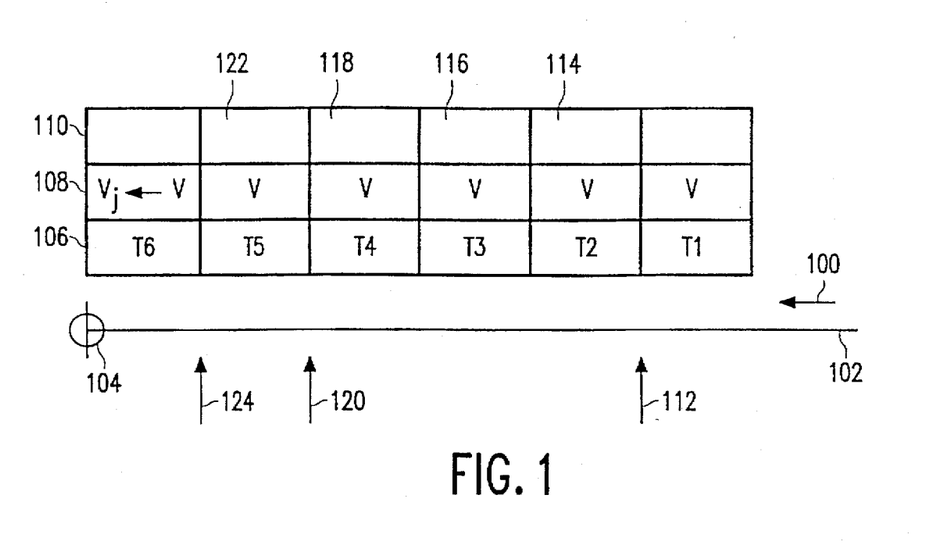
FIG. 1 shows a model concerning the issuing of direct advice.

FIG. 1 shows a model concerning the issuing of a direct advice when a manoeuvre location is approached. The road on which a vehicle travels in a direction 100 is denoted by the reference 102 and the manoeuvre location is denoted by the reference 104. After the advice has been given, several periods of time elapse, as explained hereinafter, during which the vehicle travels on the mad. This is symbolically represented by plotting the periods of time as columns above the road; it is to be noted that the width of the columns in the Figures is not proportional to the actual period of time or the distance travelled. Row 106 contains the designation of the periods of time, T1 to T6. The row 108 contains the speed of the vehicle during the periods of time, and row 110 states the driver's activity during these periods of time. During T1 the instruction generator issues an instruction describing the manoeuvre to be carried out and completes this operation at 112. The instruction may be a spoken message, supplemented by a symbol on a display of the navigation system. The driver subsequently requires a period of time T2 for a first response which is denoted by the reference 114. Subsequently, during T3 the driver interprets the instruction received at 116 and, after evaluation 118 in the period T4, the driver makes a decision as regards an action in preparation of the manoeuvre to be carded out. In the example of FIG. 1 the manoeuvre is a turn off at an intersection; the preparatory action then consists in reducing the speed to the speed $V_j$ at which turning off will take place. After the decision has been taken at 120, the driver requires a further period T5 to start the actual deceleration, denoted by 122. At 124 the actual deceleration commences and after a period T6 the vehicle has reached the desired speed at the junction 104. The periods T2+T3+T4+T5 together are referred to as $T_{response}$ and are considered to be the driver's response time. After an instruction has been issued, the vehicle continues to travel at the original speed V for the entire response time. It is only during T6 that the speed is reduced.

Figure 2:
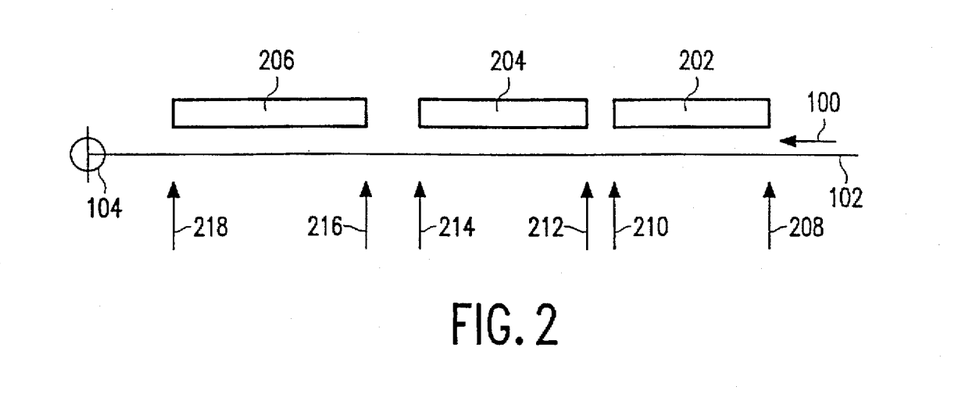
FIG. 2 shows a model with windows for issuing instructions.

FIG. 2 shows a model with windows for the various types of instruction. The windows are positioned in relation to the road 102 in order to indicate how various windows can become active at various points along the road as the manoeuvre location 104 is approached. There is a life sign window 202 in which instructions are issued which are not directly related to a manoeuvre to be carried out. These life signs serve to confirm to the driver the correct operation of the navigation system and the correctness of the route followed. By giving life signs, it is prevented that the driver does not receive any information from the system for a prolonged period of time. In the notification window 204 instructions are given which anticipate as a preliminary advice on the instruction indicating the actual manoeuvre. Such a preliminary advice draws the driver's attention to the fact that a manoeuvre location is coming up and, if necessary, the driver can already be informed to some extent as regards the nature of the manoeuvre to be carried out. In the direct advice window the instructions describing which manoeuvre is to be carried out and in which location are issued.

In a given embodiment of the navigation system, instructions are issued in a manner which will be illustrated on the basis of the following example. In this example a car travels on a road to an intersection where a given turn is to be taken. For as long as the distance from the intersection is comparatively large, the system does not yet supply instructions concerning the intersection but only general route information. This information is intended mainly to put the driver at ease. At such a comparatively large distance the car is present within the life sign window. After some time, the car has come so near to the intersection that the system warns that an intersection is coming up. The system then also provides an indication as to the type of manoeuvre to be carried out at the relevant intersection. At this distance the car is present within the notification window. Finally, when the car has come even nearer to the intersection the system issues the instruction to carry out the manoeuvre. At this distance the car is within the direct advice window. When the car is in one of the above windows, the system can repeat the message associated with the relevant window. Furthermore, the repeated message can be adapted to changing circumstances, for example by stating the actual distance from the manoeuvre location each time when a notification is given. However, other adaptations are also possible.

An example of a life sign is a confirmation that a manoeuvre just executed was correct or a confirmation that the route being followed is correct. Another possibility consists in a description of certain objects in the immediate vicinity of the vehicle, provided that this type of information is available to the navigation system. A notification has two functions: it is an indication that something is coming up and it is a first description of what is coming up. An example of a notification is the message "LEFT TURN COMING UP". This message on the one hand acts as an indication that a manoeuvre has to be performed after some time, and on the other hand allows for the manoeuvre to be prepared, i.e. in this case switching to the left lane when the road in question comprises several lanes. An example of a direct advice associated with the above notification is the message "TURN LEFT". The direct advice and the notification contain dam relating primarily to the vehicle and its movements. Considering his task, a driver derives an action for himself therefrom. This difference can be illustrated on the basis of a practical traffic example: a sign over a highway bears the indication 70 km/h. This sign indicates the maximum permissible vehicle speed. A driver will interpret this as deceleration to 70 km/h.

In one embodiment of the navigation system the instructions do not consist exclusively of spoken messages; in addition a symbol characterizing the manoeuvre to be executed is displayed. It is ensured that a symbol of an instruction is visible on the display at the instant at which the relevant message is spoken.

The life sign window in FIG. 2 starts at point 208, being situated, for example immediately after a preceding manoeuvre location, and terminates at point 210. Following an intermediate space, the notification window commences at point 212 and terminates at 214. Finally, after a further intermediate space the direct advice window commences at 216. The direct advice window terminates at point 218. With a view to traffic safety no further instructions are given between the point 218 and the manoeuvre location. The boundaries of the direct advice window and the notification window are determined on the basis of a number of ambient factors and are related to the manoeuvre location in respect of position. For the life sign window, however, the boundary 210 is dependent on the manoeuvre location 104 but the boundary 208 is dependent on the preceding manoeuvre location. The width of a life sign window is thus determined by the distance between the relevant manoeuvre locations. In the case of a small spacing therebetween, the life sign window, and hence a life sign, may be fully absent. It may also occur that in similar temporal conditions the notification is not given. The direct advice is issued on the basis of the considerations described with reference to FIG. 1. The determination of the direct advice window and the instant at which the direct advice is issued takes into account the distance travelled by the vehicle during said period $T_{response}$.

The positions of the boundaries of the windows in FIG. 2 are chosen so that adequate time is available to carry out the actions associated with the relevant manoeuvre. This means that a boundary need not be situated at a fixed distance from the manoeuvre location, but that this distance is dependent on the speed of the vehicle. In the case of a high speed, the distance from the manoeuvre location will have to be longer than in the case of a low speed. In a given embodiment of the system, the deceleration behaviour of the vehicle is accurately modelled. In addition to the instantaneous speed of the vehicle, a prescribed minimum deceleration of the vehicle and a friction coefficient of the road are taken into account. The use of such a model is necessary because the distance required for deceleration is strongly dependent on the instantaneous speed. This distance is proportional to the square of the difference between the instantaneous speed and the desired speed. Furthermore, the position of a boundary is dependent on the speed at which a manoeuvre is to be carded out. In the case of a turn on an intersection with secondary roads, the speed will have to be much lower than in the case of an exit on a clover leaf of main roads with sweeping curves. If a lower speed is required to carry out the manoeuvre, a longer path will be required to reduce the vehicle speed to said lower speed. In an embodiment of the system in accordance with the invention, the distance required for deceleration is taken into account in the determination of the boundaries of the windows.

As a result of the use of the various types of instruction, the driver continuously has information available as regards the route followed. In a given embodiment of the system in accordance with the invention, the distance from the manoeuvre location is displayed and continuously updated.

Figure 3:
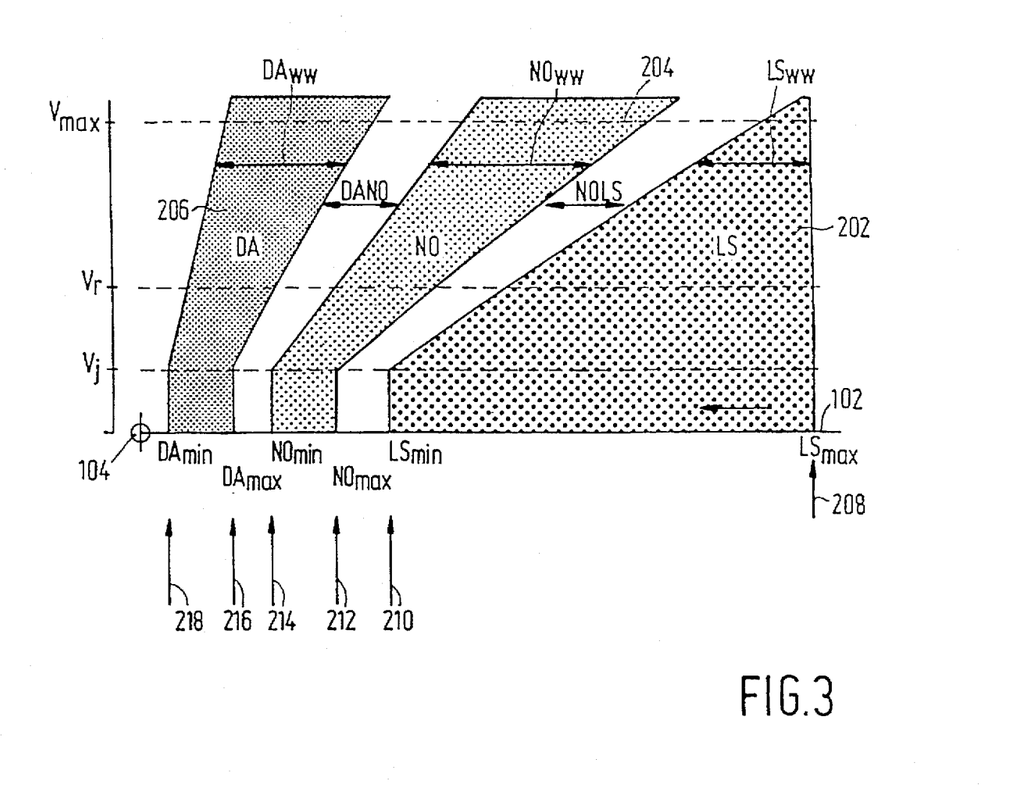
FIG. 3 shows a model with the speed-dependency of the windows.

FIG. 3 shows a model with the speed dependency of said windows. The horizontal axis in the Figure represents the road 102 leading to the manoeuvre location 104. On the vertical axis the vehicle speed is plotted, increasing from 0 to a given maximum speed $V_{max}$ still supported by the system. The speed $V_j$ is the speed at which the vehicle can carry out the manoeuvre, and the speed $V_r$ is the speed which is characteristic of the mad on which the vehicle travels. For a given vehicle speed, corresponding to a given horizontal line in the Figure, the boundaries used for the three windows by the system can be read. In the case of a high vehicle speed, the boundaries will be situated further from the manoeuvre location, as is denoted by the oblique lines in FIG. 3. When the vehicle speed is lower than the speed $V_j$, the boundaries remain in fixed positions and no longer change as the speed changes.

An embodiment of the navigation system in accordance with the invention determines the boundaries by means of the following formulas:

if V is larger than $V_j$:

$$DA_{min}=V\times T_{response}+(V^2-V_j^2)/4$$

$$DA_{max}=DA_{min}+(V\times DA_{ww})$$

$$NO_{min}=DA_{max}+(V\times DANO)$$

$$NO_{max}=NO_{min}+(V\times NO_{ww})$$

$$LS_{min}=NO_{max}+(V\times NOLS)$$

if V is smaller than $V_j$:

$$DA_{min}=V_j\times T_{response}$$

$$DA_{max}=DA_{min}+(V_j\times DA_{ww})$$

$$NO_{min}=DA_{max}+(V_j\times DANO)$$

$$NO_{max}=NO_{min}+(V_j\times NO_{ww})$$

$$LS_{min}=NO_{max}+(V_j\times NOLS).$$

Therein:

| | |
|---|---|
| $DA_{min}$ | the lower boundary 218 of the direct advice window |
| $DA_{ww}$ | the width (in time) of the direct advice window |
| $DA_{max}$ | the upper boundary 216 of the direct advice window |
| DANO | the space (in time) between the direct advice window and the notification window |
| $NO_{min}$ | the lower boundary 214 of the notification window |
| $NO_{ww}$ | the width (in time) of the notification window |
| $NO_{max}$ | the upper boundary 212 of the notification window |
| NOLS | the space (in time) between the notification window and the life sign window |
| $LS_{min}$ | the lower boundary 210 of the life sign window |
| $T_{response}$ | the time between the end of the message and the beginning of deceleration of the vehicle |
| V | the instantaneous vehicle speed |
| $V_j$ | the speed at which the manoeuvre can be carried out. |

A vehicle can enter the road 102 of FIG. 3 at various positions relative to the manoeuvre location. The vehicle will usually arrive on the line 102 via a manoeuvre at an intersection. Because the speed is still low due to the preceding manoeuvre, the vehicle will be present at a point at the bottom of FIG. 3. In order to determine the type of instruction to be issued by the system, a speed increase to $V_r$, being the characteristic speed for the road 102, is anticipated. Such anticipation prevents an excessively fast succession of different messages which would otherwise occur due to the acceleration of the vehicle. The boundaries of the windows have been chosen for a vehicle which initially approaches the manoeuvre location at a constant speed; therefore, a strongly accelerating vehicle should be dealt with in a specific way.

A Figure such as FIG. 3 shows only the speed dependency of the boundaries of the windows. For such a Figure a choice for some other parameters is made in conformity with the circumstances. Examples of such parameters are the class of road on which the vehicle travels and the type of area in which the road extends. A given embodiment of the system in accordance with the invention utilizes the following parameter table:

|          | rural |       | urban |       |
| road class | $V_r$ | $V_j$ | $V_r$ | $V_j$ |
|----------|-------|-------|-------|-------|
| 0 | 130 | 90 | 100 | 90 |
| 1 | 100 | 60 | 90 | 50 |
| 2 | 90 | 50 | 70 | 40 |
| 3 | 80 | 40 | 50 | 30 |
| 4 | 80 | 40 | 50 | 30 |
| 5 | 60 | 30 | 30 | 20 |
| 6 | 40 | 20 | 20 | 10 |

The road class represents the importance of a road in relation to the entire infrastructure. In this embodiment the following classes are defined:

| 0 | motorway |
|---|----------|
| 1 | main road |
| 2 | primary connector |
| 3 | local connector |
| 4 | local distributor |
| 5 | estate road |
| 6 | restricted road |

Figure 4:
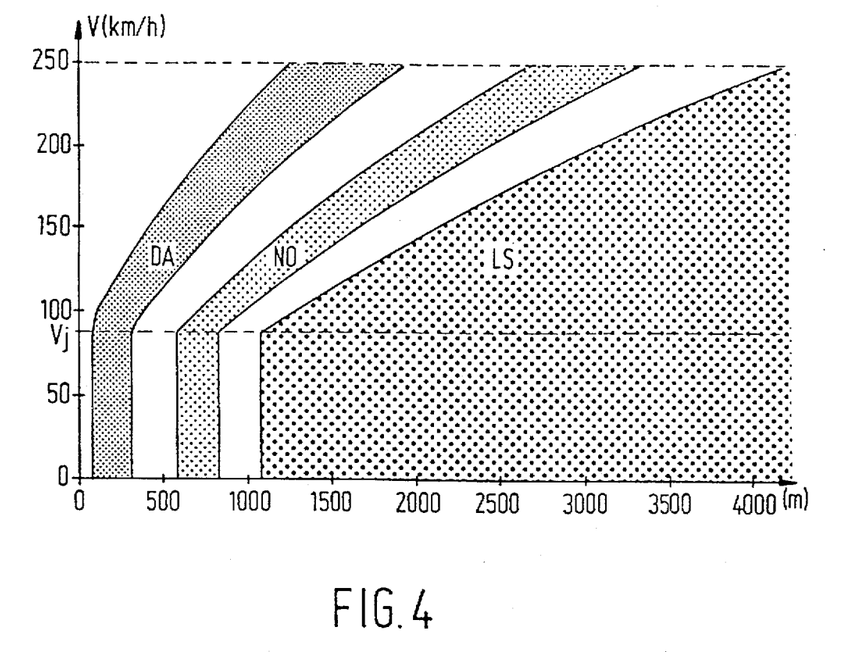
FIG. 4 shows a detailed example of the windows.

FIG. 4 shows a detailed example of the above model. The distance from the intersection is plotted on the horizontal axis and the vehicle speed is plotted on the vertical axis. The various windows in this Figure have been determined for a motorway.

FIG. 5 shows a further detailed example of the model. The windows have been determined in the same way as in FIG. 4, be it for a local distributor in an urban area.

A system in accordance with the invention bases the boundaries of the windows inter alia on the speed $V_j$ at which the vehicle can execute a manoeuvre. This speed $V_j$ can be determined on the basis of other information concerning the manoeuvre location and the road on which the vehicle travels. A number of examples of this information will be described hereinafter. A road is a link whereto a given importance may be assigned; it may, for example be the sole link between two large cities. The roads are classified on the basis of this importance. An important link is constructed so that it can handle a large amount of traffic; this means that manoeuvres can be carried out faster on such a road. Furthermore, there is the nature of the road. Examples thereof are a motorway, a main road with separate lanes, and a service road. The number of lands of a road also forms an indication as regards the manoeuvre locations on the road, and hence an indication as regards the speed at which manoeuvres can be carried out. The type of manoeuvre location is also important: a turn at an intersection with perpendicularly crossing roads will be carried out more slowly than a turn at a Y fork where a split-off road continues with a slight curve. The area in which a manoeuvre location is situated is also of importance. In this case a distinction is usually made between an urban area and a rural area.

Some types of manoeuvre location are preceded by a comparatively long segment of the associated road. Examples in this respect are an exit of a motorway where a long exit lane enables the traffic to decelerate adjacent the main lanes, and a bifurcation of a major road into two other roads where the two roads extend in parallel up to the actual bifurcation over a long distance, so as to allow the traffic to choose the correct road. For this type of manoeuvre location a manoeuvre should be executed prior to the actual manoeuvre location; therefore, in a system in accordance with the invention a predetermined distance is added to the boundaries of the windows for these situations.

Upon following of a route, successive manoeuvre locations may be situated at such a short distance from one another that there is no time to issue a notification for the second manoeuvre location. In order to enable a notification to be issued nevertheless, the direct advices of the two manoeuvre locations can be concatenated and issued prior to the first manoeuvre location. During the execution of the first manoeuvre the second manoeuvre can thus already be taken into account, for example by already choosing a given lane.

The road 102 of FIG. 2 may comprise other locations, for example intersections, ahead of the manoeuvre location, without the vehicle having to carry out a manoeuvre at said other locations. If such other location is present within the direct advice window, i.e. between the points 218 and 216, there is a risk of uncertainty as to which road location the direct advice relates. A system in accordance with the invention, therefore, takes up other locations present in the direct advice window of the manoeuvre location into the direct advice. In that case a direct advice is given in a window positioned relative to said other location. This direct advice describes the manoeuvre to be carried out in relation to the other location. An example in this respect is the message "TURN LEFT SECOND ROAD".

Furthermore, in the case of a high vehicle speed an adapted deceleration behaviour of the vehicle can be taken into account. It has been found that at vehicle speeds of up to approximately $V_r$, being the characteristic speed for a given road, deceleration takes place mainly by braking as described above with reference to FIG. 3. However, in cases where the vehicle speed is significantly higher than $V_r$, it appears that deceleration takes place first of all by releasing the accelerator, and that the actual brakes are applied only later. This results in a different vehicle behaviour upon approaching the manoeuvre location, which behaviour can be used to adapt the boundaries of the windows to this high speed.

To those skirted in the art it will be evident that the navigation system in accordance with the invention can be extended in various ways. An example of such an extension is to render the boundaries of the windows dependent also on the type of road on which the vehicle travels. The instant, and hence the position, of issuing of an instruction is thus rendered dependent on the kind of road. Some examples of types of road defined in a given embodiment of the system are stated hereinafter:

motorway multi carriageway single carriageway, $\geq 4$ lanes single carriageway, <4 lanes service road parking place A further possible extension is to make the boundaries of the windows also dependent on the manoeuvre location. This may concern the geometry of the manoeuvre location as well as the type. Some examples of types of manoeuvre locations defined in an embodiment of the invention are:

motorway exit motorway entrance motorway bifurcation multi carriageway bifurcation roundabout square A further extension concerns the estimation of the variation of the speed of the vehicle as it approaches the manoeuvre location. As is described with reference to FIGS. 2 and 3, in a present embodiment of the system a given model is used to predict the variation of the vehicle speed. The system can be refined by utilizing the actual speed variation, determined by measuring the vehicle speed at a few successive instants, for more accurate prediction of the expected vehicle speed. The boundaries of the windows can thus be adapted even more accurately to the actual situation. Another possible extension concerns the adaptation of the issuing of instructions by the system to the driver. Such adaptation can be based on commands for changes which are entered by the driver himself. For example, a driver may state that he wishes to receive the instructions at a greater distance from the manoeuvre location or that he does not wish to receive any audible life signs in given circumstances. Adaptation may also be based on a learning behaviour of the system on the basis of previous use. For example, when a given route has been travelled a number of times already, the system can adapt the instructions given to this fact; only minimum directives can then be given, or directives only if deviation from the traditional route is necessary because of a traffic jam. Another example is that the system learns from the driving behaviour of the driver on previous routes and adapts the instructions on the basis thereof.

I claim:

1. A vehicle navigation system for use in a vehicle, said system comprising:
   a planner for a route to be followed which includes the indication of a manoeuvre location in which the vehicle is to carry out a manoeuvre, detection means for detecting a location of the vehicle, and an instruction generator, coupled to said detection means for supplying an instruction concerning said manoeuvre, wherein the instruction generator, in response to the location of said vehicle, generates an anticipatory notification during a first time period, a direct advice notification during a second time period and a a life sign during a third time period for indicating an operational status of the system;
   wherein said first time period is prior to said second time period, said anticipatory notification and said direct advice notification are not simultaneously conveyed to a driver of said vehicle; and
   the instruction generator generates the direct advice notification when the vehicle is present within said second time period which extends from a lower boundary at a distance $DA_{min}$ from the manoeuvre location to an upper boundary at a distance $DA_{max}$ from the manoeuvre location, that the instruction generator generates the anticipatory notification when the vehicle is present within said first time period which extends from a lower boundary at a distance $NO_{min}$ from the manoeuvre location to an upper boundary at a distance $NO_{max}$ from the manoeuvre location, and that the instruction generator generates the life sign when the vehicle is present within said third time period which extends from a lower boundary at a distance $LS_{min}$ from the manoeuvre location.

2. A system as claimed in claim 1, wherein the instruction generator generates said anticipatory notification and said direct advice notification in dependence on one an instantaneous speed V and an instantaneous location of the vehicle.

3. A system as claimed in claim 1, wherein said instruction generator includes means for determining the time required by the driver to respond to said generated direct advice notification, and wherein said instruction generator conveys said direct advice notification based on said determined time.

4. A system as claimed in claim 1, wherein the instruction generator determines an instant at which the direct advice notification is generated in dependence on a speed $V_j$ which is characteristic of the execution of the manoeuvre.

5. A system as claimed in claim 1, wherein the vehicle travels during the second time period for a travel time $DA_{ww}$, that between the first time period and the second time period the vehicle travels for a travel time DANO, that the vehicle travels during the first time period for a travel time $NO_{ww}$, and that between the first time period and the third time period the vehicle travels for a travel time NOLS.

6. A system as claimed in claim 5, wherein the boundaries of the time periods are dependent on a period $T_{response}$ which is characteristic of a time required by the driver to respond to said generated direct advice notification, that the boundaries of the time periods are dependent on an instantaneous speed V of the vehicle at the time of issuing of the instruction, that the boundaries of the time periods are dependent on a speed $V_j$ which has been determined in advance and whose value is dependent on the manoeuvre location, and that when V is greater than $V_j$, the boundaries of the time periods are determined substantially by:

$$DA_{min}=V \times T_{response}+(V^2-V_j^2)/4$$

$$DA_{max}=DA_{min}+(V \times DA_{ww})$$

$$NO_{min}=DA_{max}+(V \times DANO)$$

$$NO_{max}=NO_{min}+(V \times NO_{ww})$$

$$LS_{min}=NO_{max}+(V \times NOLS)$$

and that when V is smaller than they are determined substantially by:

$$DA_{min}=V_j \times T_{response}$$

$$DA_{max}=DA_{min}+(V_j \times DA_{ww})$$

$$NO_{min}=DA_{max}+(V_j \times DANO)$$

$$NO_{max}=NO_{min}+(V_j \times NO_{ww})$$

$$LS_{min}=NO_{max}+(V_j \times NOLS).$$

7. A system as claimed in claim 4, wherein the system determines the speed $V_j$ on the basis of at least one of a number of road-characterizing parameters taken from the group consisting of: a type of road leading to the manoeuvre location, a class of road, a number of lanes of the road, a type of manoeuvre location and a type of area in which the manoeuvre location is situated.

8. A system as claimed in claim 6, and including means for incrementing the boundaries of the time periods by a predetermined distance when the manoeuvre relates to a bifurcation or an exit, said predetermined distance corresponding to a length of a road segment associated with the bifurcation or the exit.

9. A system as claimed in claim 6, including means for determining the boundaries of the time periods as a function of a road speed $V_r$.

10. A system as claimed in claim 1, wherein the instruction generator concatenates, in predetermined conditions, the direct advice notification with a further notification concerning an upcoming manoeuvre at a further manoeuvre location.

11. A system as claimed in claim 1, wherein the instruction generator generates a further direct advice notification concerning a further manoeuvre location when the direct advice time period of the manoeuvre location contains another manoeuvre location which is not associated with the route to be followed.

* * * * *